United States Patent
Reineke et al.

(10) Patent No.: US 12,388,644 B2
(45) Date of Patent: Aug. 12, 2025

(54) SYSTEMS AND METHODS FOR GENERATING AND MANAGING TOKENS FOR AUTHENTICATED ASSETS

(71) Applicant: IRON MOUNTAIN INCORPORATED, Boston, MA (US)

(72) Inventors: Nicole Reineke, Northborough, MA (US); Rodrigo Coelho Ferreira, Bushkill, PA (US); Denis Leconte, Canoga Park, CA (US); Gregory Maratea, Los Angeles, CA (US); Gabriel Nguyen, Dublin, CA (US); William J. Allen, Corvallis, OR (US)

(73) Assignee: Iron Mountain Incorporated, Boston, MA (US)

( * ) Notice: Subject to any disclaimer, the term of this patent is extended or adjusted under 35 U.S.C. 154(b) by 231 days.

(21) Appl. No.: 17/930,982

(22) Filed: Sep. 9, 2022

(65) Prior Publication Data

US 2024/0089104 A1 Mar. 14, 2024

(51) Int. Cl.
*H04L 9/32* (2006.01)
*H04L 9/00* (2022.01)

(52) U.S. Cl.
CPC .......... *H04L 9/3213* (2013.01); *H04L 9/3218* (2013.01); *H04L 9/50* (2022.05)

(58) Field of Classification Search
CPC ........ H04L 9/3213; H04L 9/3218; H04L 9/50
See application file for complete search history.

(56) References Cited

U.S. PATENT DOCUMENTS

| | | | | |
|---|---|---|---|---|
| 10,862,825 B1 * | 12/2020 | Gammel | ................. | H04L 47/78 |
| 2021/0295431 A1 * | 9/2021 | Vo | ......................... | G06Q 10/10 |
| 2023/0098615 A1 * | 3/2023 | Advani | .................... | H04L 63/00 |
| | | | | 713/193 |
| 2023/0108366 A1 * | 4/2023 | Tang | .................. | G06Q 20/3672 |
| | | | | 705/66 |
| 2023/0334480 A1 * | 10/2023 | Norton | ............... | G06Q 20/3827 |
| 2023/0334488 A1 * | 10/2023 | Reineke | ................ | G06Q 30/06 |
| 2023/0353570 A1 * | 11/2023 | Lee | .......................... | H04L 63/10 |
| 2023/0396443 A1 * | 12/2023 | O'Dwyer | .............. | H04L 9/3239 |
| 2023/0419306 A1 * | 12/2023 | Shulman | .......... | G06Q 20/38215 |
| 2024/0013195 A1 * | 1/2024 | Osborn | ................ | G06Q 30/018 |
| 2024/0087006 A1 * | 3/2024 | Ectors | ................ | G06Q 30/0282 |

OTHER PUBLICATIONS

Benson, "Yes, Your NFTs Can Go Missing—Here's What You Can Do About It," Decrypt, Mar. 19, 2021, 6 pages, Available online at: https://decrypt.co/62037/missing-or-stolen-nfts-how-to-protect.

Cwirko, "Tools for automated NFT minting," Nov. 4, 2021, 9 pages, Available online at: https://www.julian.io/articles/elven-nft-tools.html.

* cited by examiner

*Primary Examiner* — Chau Le
(74) *Attorney, Agent, or Firm* — Kilpatrick Townsend & Stockton LLP

(57) ABSTRACT

Features described herein generally relate to systems and methods for generating and managing tokens for authenticated assets. In some aspects, generating a token is performed according to one or more rules and includes generating metadata that links the token to a representation of an asset. In some other aspects, tracking token access includes monitoring a blockchain for token access events and generating a token based on a modified historian and received feedback. In other aspects, validating a token for an authenticated asset includes matching representations of the authenticated asset.

20 Claims, 9 Drawing Sheets

SYSTEMS AND METHODS FOR GENERATING AND MANAGING TOKENS FOR AUTHENTICATED ASSETS

FIELD

The present disclosure generally relates to tokens for authenticated assets. Particularly, the present disclosure relates to systems and methods for generating and managing tokens for authenticated assets.

BACKGROUND

A shared, secure ledger of transactions (e.g., an immutable ledger, a blockchain) provides a convenient way for users to exchange tokens in a secure manner. For example, a user may transfer ownership of an asset (which may be physical or virtual) via a non-fungible token (NFT) that is associated with the asset. In contrast to the underlying ledger technology, current methods of generating tokens, linking the generated tokens to the underlying assets, and managing the generated tokens lack a guarantee of reliability.

SUMMARY

Embodiments described herein pertain to systems and methods for generating and managing tokens for authenticated assets.

According to some embodiments, a method for generating a token includes requesting a token for an authenticated asset of one or more authenticated assets; determining one or more rules for generating the token, each rule of the one or more rules comprising one or more token generation variations; generating, according to the one or more rules, the token, the generated token including a token identifier, token owner information, and token metadata, the token metadata comprising an access link for linking the generated token to a representation of the authenticated asset; and storing the generated token, the one or more rules for generating the token, and a key for the generated token, the key linking the generated token to an asset information record for the authenticated asset. At least one of the token generation variations may include an option for designating a blockchain.

According to some embodiments, a method for monitoring a token includes monitoring a blockchain for one or more token access events for a token listed in a token marketplace, each token access event of the one or more token access events comprising at least one of a token viewing event and token transfer event; modifying a historian entry for the token, wherein the historian entry is modified based on the one or more token access events; receiving, from the token marketplace, feedback for the token, the feedback comprising at least one of a user sentiment of the token and a user quality rating of the token; and in response to modifying the historian entry and receiving the feedback, generating one or more additional tokens according to one or more token rules.

According to some embodiments, a token for an authenticated asset includes a token identifier, token owner information, and token metadata, the token metadata comprising an access link for accessing a first representation of the authenticated asset; and a method for validating the token includes receiving, from a user of a token marketplace, a request to validate the token; in response to receiving the request to validate the token, extracting, from a token vault store, a second representation of the authenticated asset; determining that the first representation of the authenticated asset matches the second representation of the authenticated asset; and in response to determining that the first representation of the authenticated asset matches the second representation of the authenticated asset, triggering one or more rules for the token.

Some embodiments of the present disclosure include a system including one or more processors. In some embodiments, the system includes a computer readable storage medium containing instructions which, when executed on the one or more processors, cause the one or more processors to perform part or all of one or more methods disclosed herein. Some embodiments of the present disclosure also include a computer-program product that includes a non-transitory machine-readable storage medium that stores instructions configured to cause one or more processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims appended hereto. Thus, it should be understood that although the subject matter as claimed has been specifically disclosed by embodiments and optional features, modification and variation of the concepts herein disclosed may be resorted to by those skilled in the art, and that such modifications and variations are considered to be within the scope of the appended claims.

BRIEF DESCRIPTIONS OF THE DRAWINGS

Aspects and features of the various embodiments will be more apparent by describing examples with reference to the accompanying drawings, in which.

Figure 1:
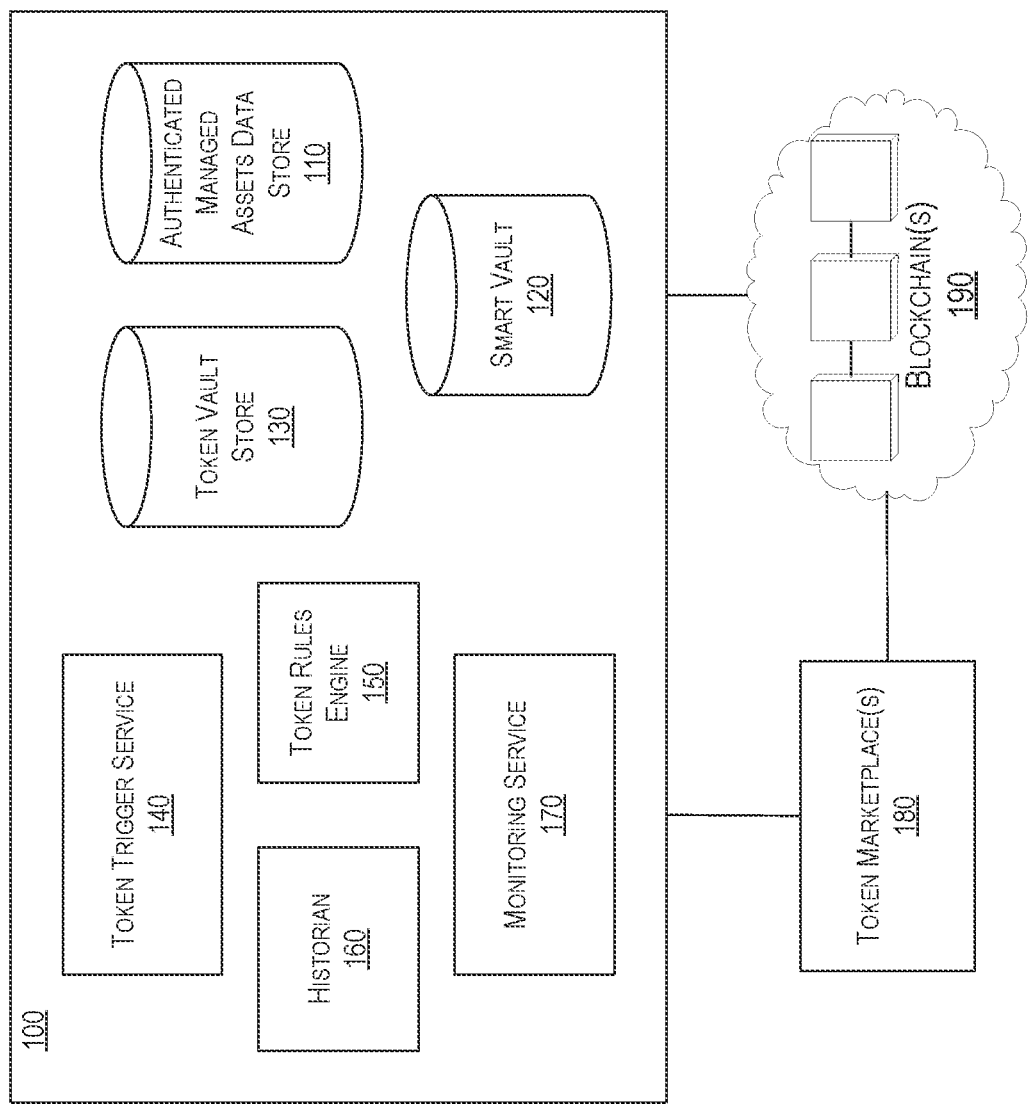
FIG. 1 shows an example configuration of a system for generating and managing tokens for authenticated assets according to aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the disclosed subject matter. However, it will be apparent that various embodiments may be practiced without these specific details. The figures and description are not intended to be restrictive. As used herein, the term "based on" means "based at least on" unless otherwise indicated. As used herein, the term "or" includes the meaning "and/or" unless directed otherwise.

A shared, secure ledger of transactions (e.g., a blockchain) provides a convenient way for users to exchange tokens in a secure manner. For example, a user may transfer ownership of an asset (which may be physical or virtual), and/or may transfer one or more other rights to the asset, via an immutable data structure, linked to a representation of the asset, that is called a non-fungible token (NFT). One example of a non-ownership right to an asset is a right to a particular type of access to the asset (an "access type"), such as a time-limited right to allow viewing of a form of the asset (e.g., an image of the asset, an interactive 3D model of the asset, etc.) or playback of a form of the asset (e.g., an audio recording, a video recording). Such a right is referred to herein as an "access-type right." Other examples of an access type for which a corresponding access-type right may be transferred by a token may include any one or more of the following: physical asset validation (e.g., by chain-of-custody creation and asset authentication), RFID tracking, live image providers, audio playback, visual playback, sensor data, inventory tracking systems data, and/or human-in-the-loop physical asset access. Access-type rights can be specified in the form of rules, and may vary. Multiple tokens for a single asset can be created such that different tokens transfer different corresponding access-type rights to the asset. This distinction may cause different tokens for the same asset to have different values in a marketplace. Through such tokenization, ownership, access-type rights, and possessory rights in assets may be stored on one or more blockchains and conveyed to others by, e.g., sale, trade, gift, etc.

For a virtual asset, it is commonly assumed that the protected content is contained within the NFT. In fact, virtual assets are generally not stored within tokens. Instead, information that is associated with the token (e.g., token metadata) links the token to the corresponding virtual asset, which is typically located or stored in a completely different location. For example, a virtual asset may be stored on a local storage medium, whereas a token associated with the asset may be stored on a blockchain, such as Ethereum. Because the virtual asset is not stored within the token, certain risks arise. For example, the virtual asset may not correspond to a representation of the asset as provided with the token, or the owner of the token may not actually have ownership or possessory rights in the virtual asset. Similarly, the asset may become dissociated with the token when the storage medium where the asset is stored is destroyed or is upgraded or otherwise modified. These risks can be mitigated by ensuring that the tokens are acquired from a trusted source that stores the underlying virtual assets securely and verifiably (e.g., by hosting the assets in a secure network or medium, such as in the InterPlanetary File System (IPFS)).

Similarly, an NFT of a physical asset may contain information which characterizes the asset, but it cannot actually contain the asset. The information which characterizes the asset may include any of, for example, a physical location of the asset, or a reference to such a location; a digitized certificate of authenticity for the asset; one or more digitized oaths and/or declarations that authenticate the asset; information generated from one or more chips and/or tags that may each be affixed to and/or embedded within the asset; etc. However, such information alone fails to resolve chain-of-custody issues, and a potential buyer has no guarantee of the ongoing existence of the original protected object (the asset), no guarantee that the object is actually at a location indicated by the token, and no guarantee that the object an NFT owner eventually lays their hands on (should the NFT owner go to collect the object) is indeed the same object for which it paid. Other shortcomings of the current environment include that metadata about a token, and activity within and on a token, is tracked on the token, so that such information remains isolated and not utilizable for other purposes (e.g., for cross-organization or market automated decisions).

Some service providers offer facilities that provide secure storage and warehousing of physical objects, including physical assets. Examples include bank vaults, underground vaults, and vaults built into mountains. These facilities offer certain advantages because they may be implemented to provide safe and climate-controlled locations to store valuable or irreplaceable assets such as documents, artwork, media assets, etc. A storage facility service provider may maintain an archive that provides an inventory of the assets and may allow for the stored physical assets (or virtual representations of the stored physical assets) to be retrieved on-demand or otherwise in a timely manner in accordance with an owner's request. Storage facility service providers typically store assets for several or many different customers. In some examples, storage facility service providers are able to interact with various marketplaces to transfer assets on behalf of their customers.

Techniques disclosed herein include systems (e.g., architectures) and methods for validating physical and/or digital assets (e.g., by chain-of-custody creation and asset authentication), determining access-type rights for the assets (e.g., by selecting and/or creating rules), generating tokens that transfer corresponding access-type rights to end users, enabling variable access to the assets (e.g., for asset validation, token validation, and/or asset use according to a transferred access-type right), and generating and utilizing historian records for both token and asset data. Such techniques may be extended to any blockchain or secure ledger, inclusive of NFT. Such techniques may use rules, historian entries, and metadata to support automation of predictive token generation, updates, transactions, automated pricing, and other activities. Examples of results that may be achieved include the automation of tokenization, token updates, pricing, and asset access associated with a token transaction. An architecture as described herein may be implemented to provide a method of establishing a direct connection between an asset, a data structure, and processes that create a chain-of-custody and physical asset check, actual access attempts, and any token. In one example, techniques as described herein may be performed by a service provider having the ability to control the physical and digital assets alongside the tokenization (e.g., a secure storage facility service provider) to reduce or effectively eliminate uncertainty in the asset's chain of custody.

The existing technology associated with tokenizing assets is nascent. Automated token generation (also called "minting") is typically performed by randomized selection or by create-on-detection. Existing token chains are historians by design and are not suitable for use as guarantors of assets or intelligent decision makers.

One problem with the existing digital tokenization environment is a lack of physical asset tracking and a failure to use asset access in digital tokenization. Current methods of tokenizing physical assets provide limited (if any) means of tracking the tokenized assets, and NFTs and blockchain architectures generally do not account for the need to authenticate, certify, and/or otherwise verify the physical assets linked to tokens. For example, NFTs and blockchain architectures do not account for the certification needs of physical assets and instead rely on manual processes. In another example, buyers, sellers, and/or other interested parties of tokens are not able to verify the authenticity of a physical asset or to certify that the physical asset is located in a particular location.

Existing tokenization solutions also lack means for capitalizing on an ability to provide digital automation of asset checks and asset access checks, or for automating tokenization based on such checks. For example, given the lack of automation available to verify physical asset authenticity, there is currently no way to charge premiums for NFTs that are certified to pass asset checks. A further problem with the existing digital tokenization environment is an inability (e.g., beyond a contractual obligation) to guarantee that a token actually represents the purported transfer of physical ownership. Unfortunately, there are currently no methods for a buyer, seller, or other interested party to look up a token's asset certification. A chain-of-custody physical asset digitization, hash, tokenization, and storage mechanism as described herein may be implemented to resolve such issues.

Existing tokenization solutions also lack the ability to automate token settings, such as varying pricing and/or level of access based on historical access. In existing token situations, marketplaces set prices, or access methods are hard-coded into the tokens on generation. Existing solutions also lack the ability to automate the generation of tokens and token variables based on similarity of tokenization, asset metadata, and asset access across multiple vendors. Techniques as described herein may be used to predict the utilization of access through the assessment of past behaviors and behaviors across similar token-types, artists, metadata or sentiment feedback loops for automatically establishing more meaningful definitions for new tokens.

With current methods, monitoring when and how a physical asset is accessed through the token is limited. Additionally, with current methods, performing some responsive action based on the monitoring (e.g., performing automatic token generation and management) is non-existent. Moreover, current methods do not provide an ability to manage pricing and access control for different physical assets owned by different customers or an ability to automate the generation of tokens across multiple marketplaces. For example, if a token for a physical asset sells for one price, current methods do not allow for the price of a token for a similar physical asset to be adjusted in response (e.g., automatically and in real-time). While tokens may include metadata or other information that links the tokens to their underlying assets, current methods do not provide an ability to track that metadata and to automate token management based on the tracking.

Features described herein may be implemented to enable new functionalities by automatically generating and managing tokens for authenticated assets. For example, a method for generating a token may include requesting a token for an authenticated asset; determining at least one rule for generating the token; generating the token according to the at least one rule; and storing the generated token along with the at least one rule and a key (e.g., a foreign key) for the generated token. In some examples, the at least one rule includes one or more token generation variations, and at least one of the token generation variations may include an option for designating a blockchain. The generated token may include a token identifier, token owner information, and token metadata, and the token metadata may include an access link for linking the generated token to a representation of the authenticated asset. In some examples, the key for the generated token links the generated token to an asset information record for the authenticated asset.

In another example, a method for monitoring a token may include monitoring a blockchain for at least one token access event for a token listed in a token marketplace; modifying a historian entry for the token; receiving, from the token marketplace, feedback for the token; and in response to modifying the historian entry and receiving the feedback, generating at least one additional token. In some examples, each token access event includes at least one of a token viewing event and a token transfer event. In some examples, the historian entry is modified based on the at least one token access event. In some examples, the feedback includes a user sentiment of the token and/or a user quality rating of the token. In some examples, the at least one additional token is generated according to at least one rule for the token.

In another example, a token for an authenticated asset includes token metadata comprising an access link for accessing a first representation of the authenticated asset; and a method for validating the token may include receiving, from a user of the token marketplace, a request to validate the token; in response to receiving the request to validate the token, extracting, from a token vault store, a second representation of the authenticated asset; determining that the first representation of the authenticated asset matches the second representation of the authenticated asset; and in response to determining that the first representation of the authenticated asset matches the second representation of the authenticated asset, triggering one or more rules for the token. In some examples, the token also includes a token identifier and/or token owner information.

An architecture (e.g., a system) for automating the creation and management of tokens for authenticated assets may include components such as the following: a) A managed asset data store to store information about each managed asset; b) A token vault to store copies of tokens for the managed assets; c) A token rules engine that includes an interface to set token creation settings and a data store to store these settings; d) A smart vault that includes an interface to allow users to obtain information about managed assets and to create and verify tokens; e) A monitoring service to trace token access events (e.g., token change events (e.g., transfers), token viewing events) and a historian to record indications of token access (e.g., to log such token access events); and f) A trigger service to detect token access events, and possibly also to detect other changes to any of the above, and to perform actions in response (e.g., to automatically generate tokens, determine access-type rights, change token rules, etc.).

The smart vault may be implemented as a secure, audited, and redundant digital content repository that allows users to search, preview, and retrieve data (e.g., instantaneously, with 24×7 access). For example, the smart vault may include an authenticated asset access interface within which users may create a token (e.g., through a shopping cart or other 'select' aspect of the interface). The smart vault may register new tokens with one or more blockchains; these tokens may include traceable access links in metadata (e.g., as defined by the trigger service and user override settings).

The smart vault may interface with multiple token marketplaces to provide validation (e.g., authentication verification) of tokens. For example, the smart vault may supply token validation by verifying existence of the tokenized assets. In one such example, the system supplies a record of proof of authenticity (automatically, or by a user via an interface) for asset validation. This record is stored within the system (e.g., for use in external verification of authenticity) and is also pushed to the marketplace (e.g., in the token and, optionally, with secondary APIs). Support for such a service aids in guaranteeing that the asset as referenced by the token exists and is legitimate.

Upon detection of a new authenticated asset in the system, the system may ascertain the organization of the owner of the asset and map the organization to a set of known settings for access types, known settings of asset types, known supported external marketplaces and blockchains, and known methods of monetization for the organization. This data may be used to automate the generation of token metadata which may include, but is not limited to, any of the following: a link to access a representation of the asset (including, e.g., listening capabilities, viewing capabilities, and/or physical verification of asset existence); a link to collect and perform automated and human-in-the-loop verification that the asset meets the expectations of the contents (e.g., sentiment data gathering, visual inspection feedback, and/or links working). This feedback may be stored in the historian. Upon insertion of the token into the end point (e.g., one or more listings on respective token marketplaces; storage to a digital wallet, storage device, or other location that may host a file or a set of files), the monitoring service may continually check for updates on the token itself and create corresponding entries into the historian.

Figure 8:
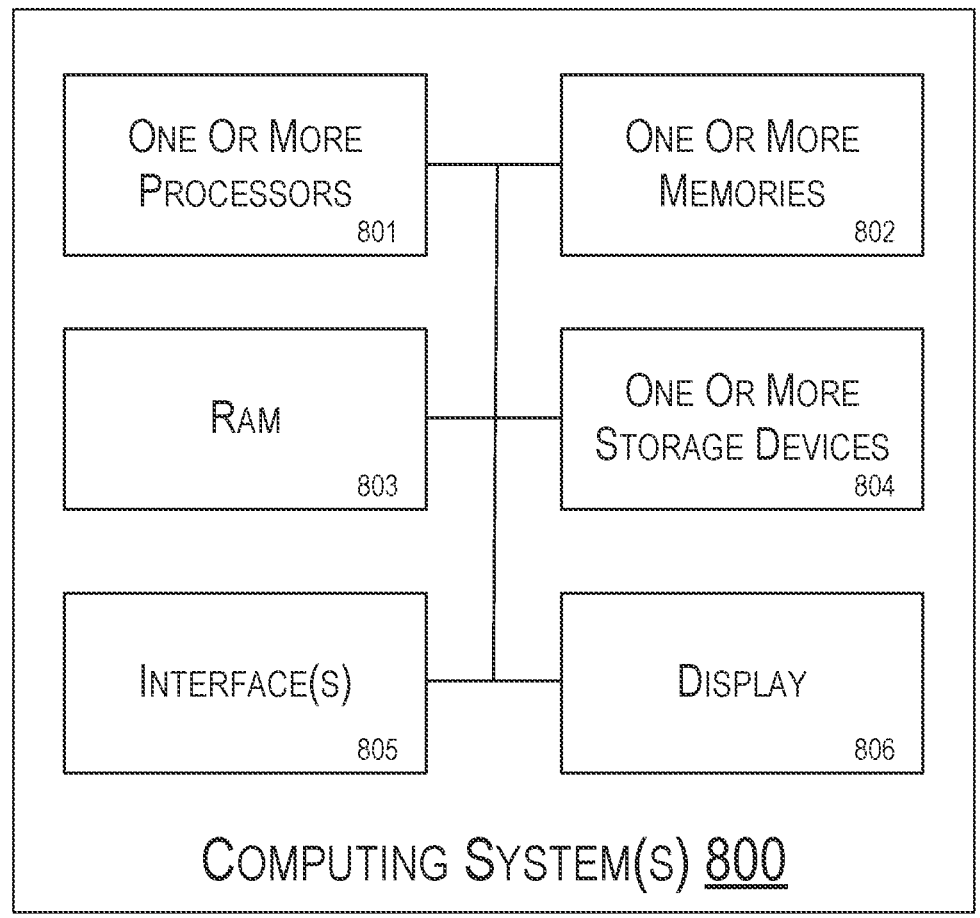
FIG. 8 shows an exemplary computing system according to aspects of the present disclosure.

FIG. 1 shows an example configuration of a token generation and management system 100 for generating and managing tokens for authenticated assets. This configuration is only one example for a system for implementing the techniques disclosed herein, and likewise the data structures are examples of data structures for use with such techniques, and such examples are not meant to limit the techniques disclosed herein. As shown in FIG. 1, the token generation and management system 100 is configured with an authenticated managed assets data store 110, a smart vault 120, a token vault store 130, a token trigger service 140, a historian 160, a token rules engine 150, and a monitoring service 170. The token generation and management system 100 is configured with hardware and software that enables the system 100 to generate and manage tokens and other data. The token generation and management system 100 may be any kind of computing device or computing system, such as computing system 800 as shown in FIG. 8. For example, the token generation and management system 100 may be a desktop computer, a personal computer, a workstation and/or any variation thereof. In another example, the token generation and management system 100 may form part of a distributed computing system. In an example, one or more (possibly all) of processes of the token generation and management system 100 or 900 may be performed as microservices of a remote or cloud computing system, or may be implemented in one or more containerized applications on a distributed system (e.g., using a container orchestrator, such as Kubernetes). Additionally or alternatively, one or more (possibly all) of the processes of the token generation and management system 100 or 900 may be performed locally as modules running on a computing platform associated with the token generation and management system 100 or 900. In either case, such a system or platform may include multiple processing devices (e.g., multiple computing devices) that collectively perform the process. In some examples, the token generation and management system 100 or 900 may be accessed through one or more application programming interfaces (APIs). Such an API may be deployed as a gateway to a microservice or a Kubernetes system on which the processes of the token generation and management system 100 or 900 may be performed. The microservice or Kubernetes system may provide computing power to serve large scale document processing operations. In other examples, the token generation and management system 100 may be any kind of electronic device that is configured to store data and generate and manage tokens in accordance with a part or all of the methods disclosed herein.

The authenticated managed assets data store (AMADS) 110 is configured to store information that characterizes assets which have been authenticated. These assets may include virtual assets, such as digital art, electronic documents, and other assets that exist in a computer-based environment. These assets may also include physical assets, such as physical artworks (e.g., paintings, sculptures), recording media, and other assets that exist in a real-world environment. In some examples, the assets may be stored by a storage facility service provider, such as a secure storage facility service provider as described above. Alternatively, or additionally, the assets may be stored on a secure and decentralized storage system, such as the InterPlanetary File System described above. The assets may be authenticated by the storage facility service provider and/or may be authenticated by a third party. In some examples, an operator of the storage facility service provider may authenticate the asset by viewing, examining, or otherwise inspecting the asset. Additionally or alternatively, an owner of an asset may supply information that authenticates the asset, such as a certificate of authenticity, an insurance policy, a declaration, and the like. In some examples, an authentication service provider may be used alone or in conjunction with the methods described above to authenticate the asset. In some examples, the AMADS 110 is configured to establish a chain of custody for each asset for which information characterizing the respective asset is stored in the AMADS 110.

The AMADS 110 stores information that characterizes an authenticated asset in an asset information record for the asset. The stored information that characterizes an authenticated asset may include any information that identifies a particular asset (Asset ID, Asset Type) and any information that links the particular asset to its owner or owners (Asset Owner), location information for the asset, along with any information that authenticates the particular asset or that may be used to authenticate the particular asset. For example, the stored information may include a serial number that identifies a particular asset; and the name, address, and other contact information that personally identifies an owner or owners of the asset; along with a digitized version of the certificate of authenticity for the particular asset. In some examples, the stored information characterizing the authenticated asset may also include instructions on how the asset may be accessed, used and/or conveyed; an asset creation date; an asset edit date(s); and an asset expiration date. Additionally or alternatively, the stored information characterizing the authenticated asset may include metadata for the authenticated asset. The metadata may include any one or more of a written description of the asset, an image of the asset, descriptions of notable identifying marks on the asset, a location in a vault or storage medium where the asset is currently located, and/or any changes to the location of the asset since the asset was first stored in the vault or storage medium. Changes in state of an authenticated asset may result in updates to the asset information record for that asset in AMADS 110. An asset information record in AMADS 110 can be updated by the storage facility service provider in custody of the corresponding asset, or by smart vault 120, at any desired time and/or based on some event. For example, an asset information record may be updated (e.g., by AMADS 110 or smart vault 120) to indicate that the corresponding physical asset has been moved from one location in a vault to another location, or to indicate that the owner of the corresponding asset has changed. In this manner, chain-of-custody information of the asset can be maintained such that this information is accessible whenever needed for governance of token-related activities (e.g., establishing proof of custody). In one example, the AMADS 110 stores at least the following information per asset: Asset ID, Asset Owner, Asset Type, Asset Settings, Asset Location, Asset Metadata, Asset Access Rules Available Types, Asset create data, and asset expiration date.

The smart vault 120 is configured to generate tokens for authenticated assets. In some examples, the authenticated assets may be stored in a storage facility service provider, such as the storage facility service provider described above. Alternatively, or additionally, in some examples, the authenticated assets may be stored on a secure and decentralized storage system, such as the InterPlanetary File System described above. The authenticated assets may be the authenticated assets for which information characterizing the authenticated assets is stored in the AMADS 110, as described above. A token as generated by the smart vault 120 may include an identifier for identifying the token, information identifying an owner or owners of the token, and information (e.g., metadata) that includes an access link that is configured to link the generated token to a representation of the authenticated asset. In some examples, the smart vault 120 may generate the token in accordance with one or more blockchain architectures such as Ethereum, Hyperledger Fabric, B2B-focused Modular Blockchain Platform, R3 Corda, Ripple, and Quorum. In some examples, the smart vault 120 may generate the token in accordance with the Ethereum ERC-721 Non-Fungible Token Standard.

The smart vault 120 is further configured to generate and store representations of the authenticated assets. The smart vault 120 may generate a representation of an authenticated asset based on, and/or including, the information characterizing the authenticated asset stored in the AMADS 110. For example, the smart vault 120 may generate the representation from information characterizing the authenticated asset (e.g., from the AMADS 110) and transform the information into a format suitable for generating the token. In one such example, the information characterizing the authenticated asset may be stored in a relational database of the AMADS 110 and transformed by the smart vault 120 into a JavaScript Object Notation (JSON) format.

The access link may be used by a user of the generated token for asset validation. For example, the user may use the access link to verify that the authenticated asset exists, that the authenticated asset is located in a particular location (e.g., within a secure storage facility and/or a secure and decentralized storage system), and that the authenticated asset is authentic. In some examples, using the access link, users of a token marketplace(s) 180 may view the representation of the authenticated asset and/or may view the authenticated asset itself. For example, a user of the token marketplace(s) 180 may browse through tokens listed in the token marketplace(s) 180, select a token, and select an option to view a representation of the authenticated asset that is linked to the token and/or to view a live view of the authenticated asset that is linked to the token. In some examples, the representation of the authenticated asset may be shown as a graphic and/or as text. In other examples, the representation shown of the authenticated asset may include a proof of authenticity for the authenticated asset. In further examples, the representation shown of the authenticated asset may include one or more pieces of information characterizing the authenticated asset. In some examples, the live view of the authenticated asset may be provided by one or more cameras installed by the storage facility service provider. The smart vault 120 may be configured according to any one or more of these examples to validate the authenticated asset and verify the chain of custody established by the AMADS 110.

In some examples, the smart vault 120 is further configured to generate tokens for authenticated assets based on user request. The smart vault 120 may be configured with a user interface that allows a user to request one or more tokens for one or more authenticated assets. In some examples, the user may be an owner of the one or more authenticated assets or an agent of the owner of the one or more authenticated assets. In some examples, based on the information characterizing authenticated assets stored in the AMADS 110, the user interface is configured to present a browser for listing all of the authenticated assets for a particular owner. In some examples, the owner and/or the owner's agent may select an authenticated asset or a group of authenticated assets and request for one or more tokens to be generated for the selected authenticated asset(s). In some examples, the user interface may be configured with a shopping cart or similar online shopping mechanism that allows users to make token requests.

The smart vault 120 may be further configured to generate tokens for authenticated assets based on rules. In some examples, the rules specify criteria that must be satisfied in order to automatically trigger the generation of one or more tokens. The rules may be configured based on input from a user through the user interface. For example, a user may configure a rule that specifies that tokens should be generated for an authenticated asset if there is increased user demand for access to the authenticated asset. Increased user demand may be monitored by the monitoring service 170, and the additional tokens may be tokens that convey use of the authenticated asset for a limited period of time.

In some examples, a set of rules may be defined for each authenticated asset for which a representation of the authenticated asset is stored in the smart vault 120. The set of rules may include rules pertaining to asset access as specified in a token and/or rules pertaining to token monetization. For example, a rule pertaining to asset access as specified in a token may specify that any tokens generated for a particular authenticated asset are tokens which grant a specific type of access to the particular authenticated asset for a specific period of time. In another example, a rule pertaining to token monetization may specify a minimum required price to convey any tokens generated for a particular authenticated asset. A rule may designate that any tokens generated for a particular authenticated asset should be registered on different blockchain(s) 190 and listed in different token marketplace(s) 180. In other examples, a rule may specify how many tokens should be generated and a different minimum price for each generated token.

Rules for each token may be stored in a token rules engine 150, which may include a data store and an interface to set default token creation settings. These settings may be established by any of, for example, asset type, owner type, owner name, organization name, vertical, etc. For each such case, the corresponding settings may include, but are not limited to, any of the following: blockchain or token creation location; token type; asset access types (e.g., access to any one or more of: physical asset validation (e.g., by chain-of-custody creation and asset authentication), RFID tracking, live image providers, audio playback, visual playback, sensor data, inventory tracking systems data, and/or human-in-the-loop physical asset access, which may be specified in a token); rules for matching representations of said assets; token proliferation rules (e.g., on access, create additional tokens); pricing models; timeframe or timed ownership; authentication link back settings (e.g., a link back to a secure physical asset holder (e.g., a secure storage facility service provider), such that the user can click on the link to verify that the asset still exists in the secure storage facility).

The token trigger service 140 may monitor the historian 160 for events that satisfy one or more rules stored in the token rules engine 150. Rules in the token rules engine 150 may be stored in an array for each token. Events in the historian 160 may be used by the token trigger service 140 to scan through the rules engine 150 to search for rule(s) that have been satisfied. When a rule has been satisfied, the token trigger service 140 uses content in the rules engine 150 to identify token information and a rule definition for the rule that has been satisfied, which may evaluate the rule definition and instruct the smart vault 120 to generate one or more additional tokens in accordance with the rule definition. In some examples, when the token trigger service 140 detects that at least one rule has been satisfied, the token trigger service 140 instructs the smart vault 120 to automatically generate one or more tokens in accordance with the one or more rules that have been satisfied.

The smart vault 120 may be further configured to register the generated tokens on one or more blockchains 190 and to list the registered tokens in token marketplace(s) 180 for the blockchain(s) 190. Using the token marketplace(s) 180, a user may browse through tokens generated and listed by the smart vault 120, select a token for viewing, and click the access link provided with the token to view the representation of the authenticated asset or the authenticated asset itself. In some examples, a user may interact with the token marketplace(s) 180 to sort and rank listed tokens and to buy and sell listed tokens. In some examples, the token marketplace(s) 180 may receive feedback that represents a user sentiment of one or more listed tokens and/or user quality for one or more listed tokens. The blockchain(s) 190 may be configured in accordance with any ledger or blockchain architectures, including, but not limited to, Ethereum, Hyperledger Fabric, B2B-focused Modular Blockchain Platform, R3 Corda, Ripple, and/or Quorum. The token marketplace(s) 180 may be configured in accordance with any marketplace for listing and conveying one or more items registered on blockchain(s) 190. Examples of token marketplaces(s) include, but are not limited to, Polygon, The Sandbox, Flow, Cosmos, Illuvium, Axie Infinity, Kusama, and OpenSea.

The token vault store 130 is configured to store copies of generated tokens. A copy of each generated token may be stored with information that characterizes the generated token, a set of rules for the generated token, and a key (e.g., a foreign key to the AMADS 110) which links the generated token to a corresponding asset information record for the authenticated asset. The information characterizing the generated token may include an identifier that identifies the generated token, a date that identifies when the token was generated, a date that identifies when the token was last modified, and an owner or owners of the token. In some examples, the set of rules for the generated token may be the same as the rules used to generate the token. In some examples, the set of rules for the generated token may be different than the rules used to generate the token. In one example, the token vault store 130 stores at least the following information per token: TokenID, AssetID_foreignKey, Token Create location URL, Token create Date, Token Rules (array), token creator, TokenOther (array).

In some examples, copies of all tokens generated by smart vault 120 are stored in the token vault store 130. In other examples, only tokens generated by smart vault 120 and listed in token marketplace(s) 180 are stored in token vault store 130. By using the user interface of the smart vault 120, a user may manage tokens that have been generated for an authenticated asset. In some examples, a user may destroy tokens for the authenticated asset and/or generate additional tokens for the authenticated asset. When a token is destroyed, it is removed from the token vault store 130. Likewise, when a token is generated, it is added to the token vault store 130. Similarly, based on information collected by the monitoring service 170, the token vault store 130 may remove tokens from the token vault store 130 when those tokens are conveyed on the token marketplace(s) 180. In this way, all tokens for a particular authenticated asset are known and can be managed with the token generation and management system 100. As a result, fraudulent token activity in blockchain(s) 190 and token marketplace(s) 180 can be readily identified and eliminated.

The historian 160 is configured to log events that occur within the token generation and management system 100, events that occur within the token marketplace(s) 180 (e.g., events relating to one or more tokens generated by the smart vault 120 that are listed in the token marketplace(s) 180), and events that occur within the blockchain(s) 190 (e.g., events relating to one or more tokens generated by the smart vault 120 that are registered with the blockchain(s) 190). The historian 160 may be configured to record activities of the AMADS 110, the smart vault 120, the token vault store 130, the token trigger service 140, the token rules engine 150, and the monitoring service 170. For example, the historian 160 may be configured to record a token generation entry whenever the smart vault 120 generates a token; to record a token removal entry whenever a token is removed from the token vault store 130; to record a token registration entry whenever the smart vault 120 registers a generated token with a blockchain(s) 190; and/or to record a token listing entry whenever the smart vault 120 lists a generated token in a token marketplace(s) 180. Because the historian 160 logs events that occur within the token generation and management system 100, a user and/or operator can trace each token generated by the smart vault 120, and each token stored in the token vault store 130, to an authenticated asset for which information characterizing the authenticated asset is stored in the AMADS 110. In this way, the historian 160 assists the token generation and management system 100 in establishing a chain of custody, and proof of custody, for an authenticated asset. Such tracking of the token creation, access, and ownership history may be used as described herein for novel treatment of tokens and assets (including, e.g., triggered creation, pricing, access, etc.).

The monitoring service 170 monitors the token marketplace(s) 180 and the blockchain(s) 190 for token access events (e.g., token viewing events, token transfer events) for one or more generated tokens registered on the blockchain(s) 190 and listed in the token marketplace(s) 180 by the smart vault 120. In some examples, the monitoring service 170 monitors the token marketplace(s) 180 and/or the blockchain(s) 190 and detects when a token registered and listed by the smart vault 120 is accessed by a user. For example, when a user of the token marketplace(s) 180 browses through tokens listed by smart vault 120 and selects a token for viewing, the monitoring service 170 detects this selection event and instructs the historian 160 to record an indication of the token access (e.g., to generate an entry for that event). Similarly, the monitoring service 170 may monitor the token marketplace(s) 180 and/or the blockchain(s) 190 and detect when a token registered and listed by the smart vault 120 is transferred from one user to another user. For example, when a user of the token marketplace(s) 180 browses through tokens listed by smart vault 120 and initiates a transfer of the token to a wallet or to a second user or other type of entity (e.g., by sale or gift), the monitoring service 170 may detect this transfer event and instruct the historian 160 to generate an entry for that event. The monitoring service 170 may be configured to trace all changes to tokens generated by system 100 and to create historian entries on change or detection of access.

In some examples, a token may be listed by a user on a token marketplace that the smart vault 120 did not list the token with. For example, the token may be obtained fraudulently by a user and listed on a different token marketplace than the token marketplace specified by the smart vault 120. Also, a token listed by a user on a token marketplace may have been previously removed from the token vault store 130. In cases such as these, the monitoring service 170 may monitor the blockchain(s) 190 for a token access event for the token and instruct the historian 160 to generate an entry for that event.

In some examples, a user of the token marketplace(s) 180 may provide feedback for a listed token. This feedback can be provided through human-in-the-loop tracing mechanisms (as in selecting a rating or explicit satisfaction survey requests), passive monitoring (as in hover or click tracing, video analytics on facial expressions, audio analysis, or detected changes in an avatar's stance or expression in a metaverse use case), or any number of other user-sentiment or experience-measurement tracing mechanisms. For example, when a user of the token marketplace(s) 180 browses through tokens listed by smart vault 120 and selects the same token for viewing on multiple occasions, the monitoring service 170 may detect this token selection activity as a user-sentiment event and instruct the historian 160 to generate an entry for that event. Similarly, when a user of the token marketplace(s) 180 browses through tokens and assigns a positive or negative rating to the token, the monitoring service 170 may detect this rating assignment as a user-quality event and instruct the historian 160 to generate an entry for that event.

Figure 9:
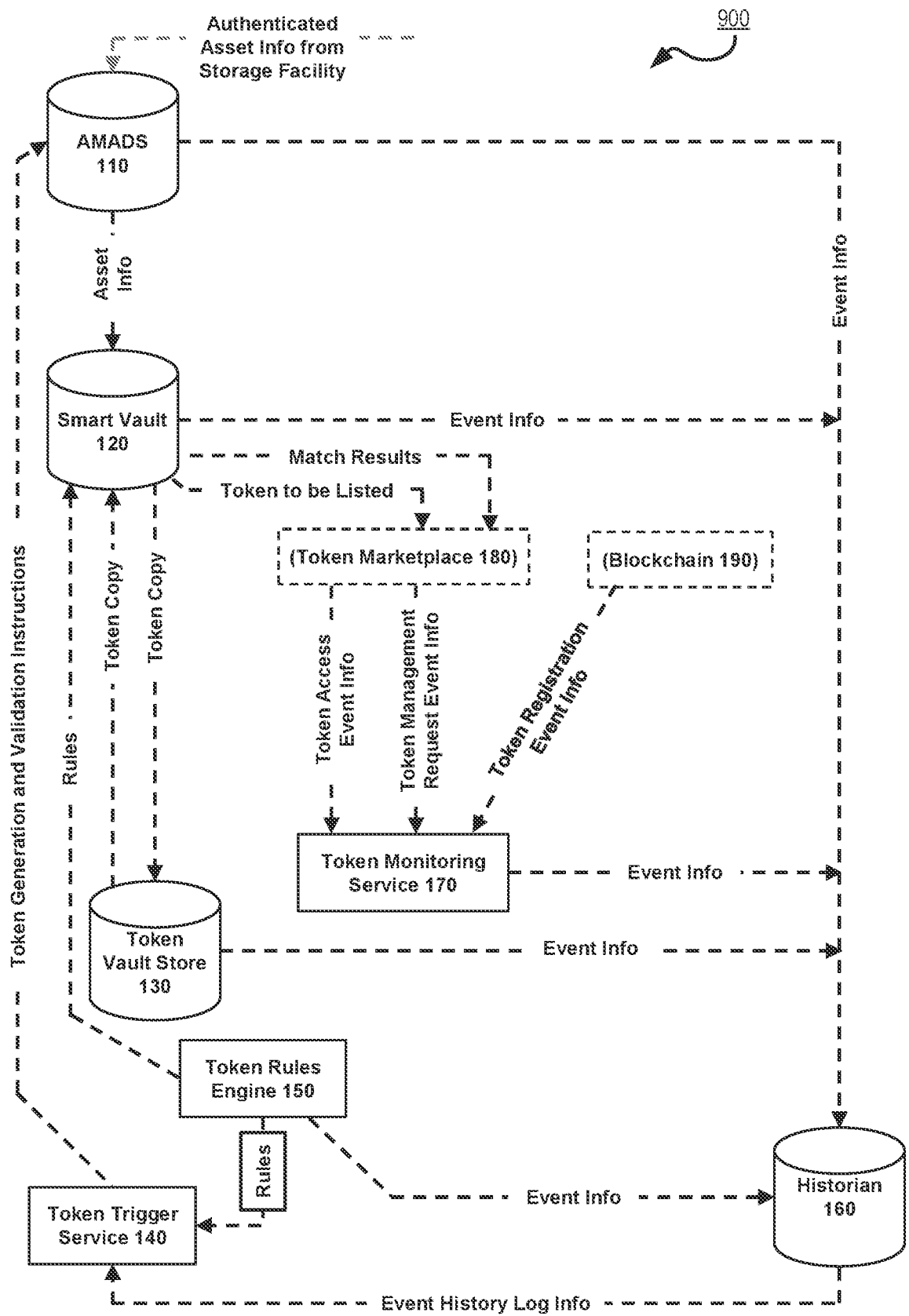
FIG. 9 shows another example configuration of a system for generating and managing tokens, including data flows, for authenticated assets according to aspects of the present disclosure.

The token trigger service 140 may be configured to automatically generate, change or perform other actions in the creation and management of tokens and their auxiliary services upon detecting a change to a component (e.g., any internal datastore, historian, rules, AMADS) of system 100. FIG. 9 shows another example configuration 900, including data flows as described herein, of the token generation and management system 100 for generating and managing tokens for authenticated assets. It is noted that token marketplace 180 and blockchain 190 are not components of the system 900 and are external to it.

Figure 2:
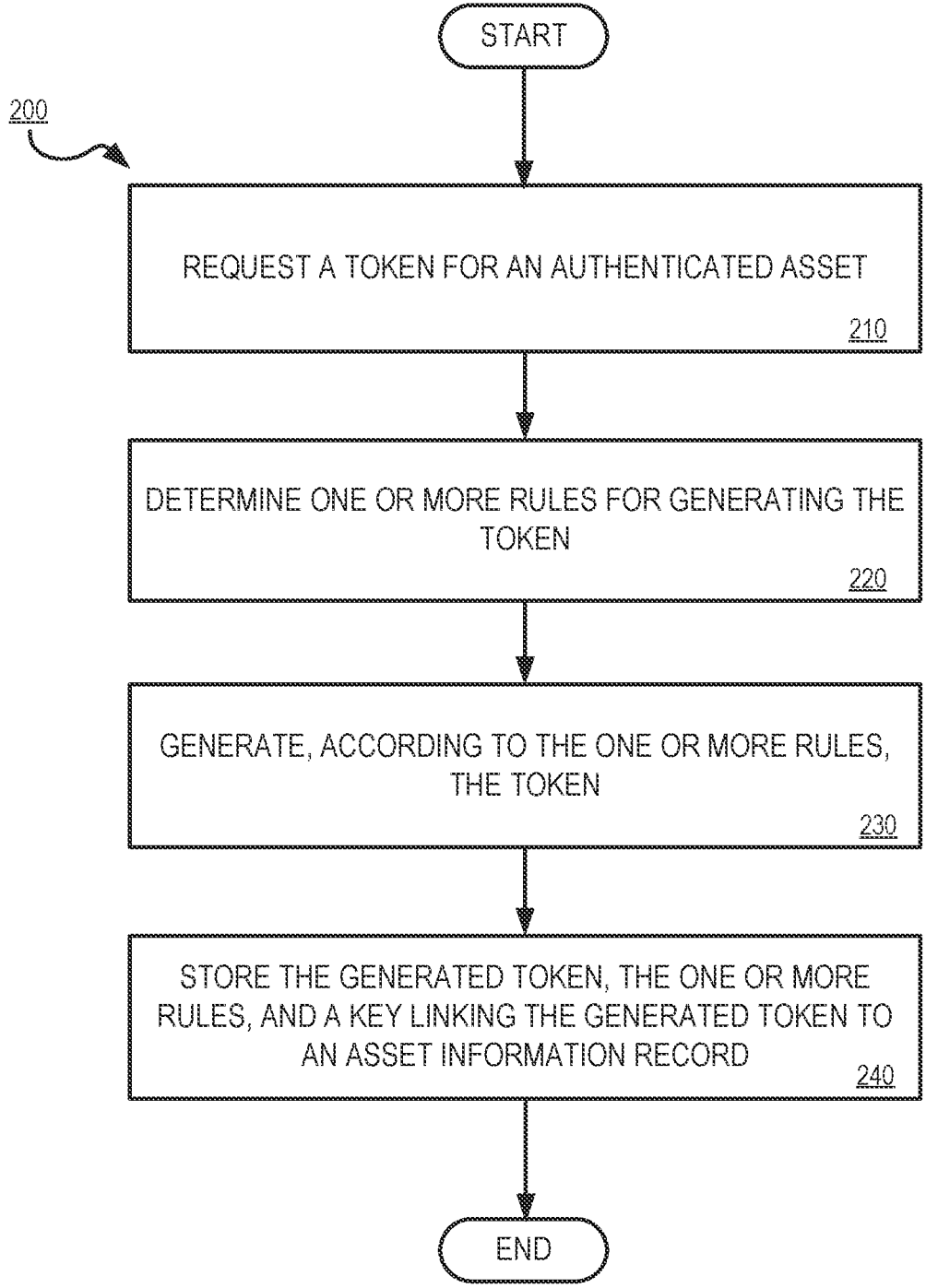
FIG. 2 shows a flowchart of an exemplary process for generating a token according to aspects of the present disclosure.

FIG. 2 shows a flowchart of an exemplary process 200 for generating a token. In some examples, the token generation process 200 is implemented by the token generation and management system 100 or another computing system, such as computing system 800 as shown in FIG. 8. The token generation process 200 can be implemented in software or hardware or any combination thereof.

At block 210, a token is requested for an authenticated asset. In some examples, a token request may be initiated by a user (e.g., via an interface) and/or generated based on rules.

At block 220, one or more rules for generating the token are determined. In some examples, each rule includes one or more token generation variations, and at least one of the token generation variations may include an option for designating a blockchain. In these or other examples, at least one of the token generation variations may specify an access-type right to be transferred.

At block 230, the token is generated according to the one or more rules. In some examples, the generated token includes a token identifier, token owner information, and token metadata, the token metadata comprising an access link for linking the generated token to a representation of the authenticated asset.

At block 240, the generated token, the one or more rules for the generating the token, and a key for the generated token are stored. In some examples, the key (e.g., a foreign key) links the generated token to an asset information record for the authenticated asset.

Figure 3:
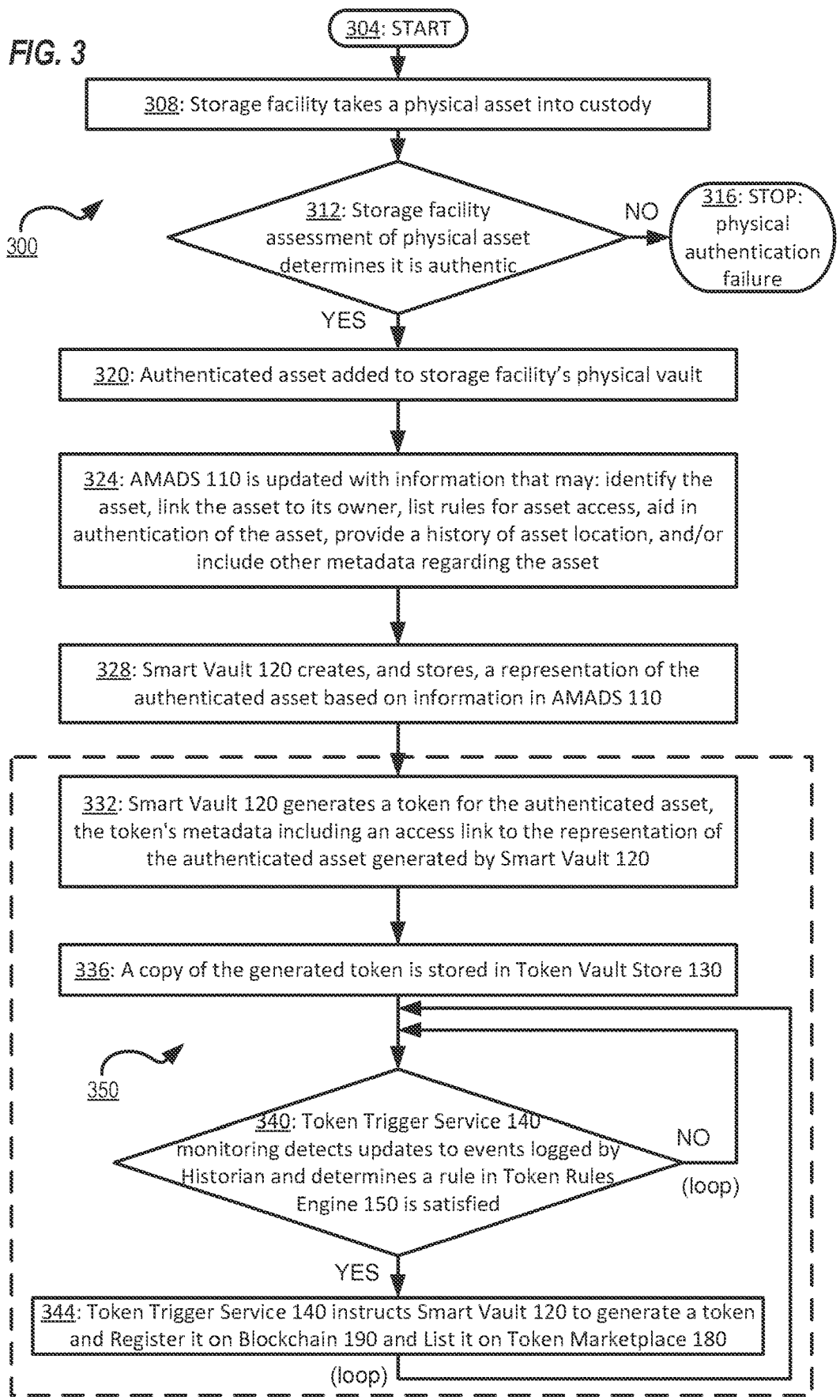
FIG. 3 shows a flowchart of an exemplary process for asset management that includes a process for generating a token, registering the token on a blockchain, and listing the token on a marketplace according to aspects of the present disclosure.

FIG. 3 shows a flowchart of an exemplary process 300 for asset management that includes a process 350 for generating a token, registering the token on a blockchain, and listing the token on a marketplace. In some examples, the token generation, registration, and listing process 350 (e.g., together with blocks 324 and 328 of process 300) is implemented by the token generation and management system 100 or another computing system, such as computing system 800 as shown in FIG. 8. The token generation, registration, and listing process 350 (e.g., together with blocks 324 and 328 of process 300) can be implemented in software or hardware or any combination thereof. At block 308 of process 300, a storage facility takes a physical asset into custody. At block 312, the storage facility assesses the physical asset to determine whether the asset is authentic. At block 316, if the determination is negative, the process stops (e.g., due to physical authentication failure). At block 320, if the determination is positive, the authenticated asset is added to the storage facility's physical vault. At block 324, the AMADS 110 is updated with information that may: identify the asset, link the asset to its owner, list rules for asset access, aid in authentication of the asset, provide a history of asset location, and/or include other metadata regarding the asset. At block 328, the smart vault 120 creates and stores a representation of the authenticated asset based on information in AMADS 110. At block 332 of process 350, the smart vault 120 generates a token for the authenticated asset, the token's metadata including an access link to the representation of the authenticated asset generated by the smart vault 120. At block 336, a copy of the generated token is stored in token vault store 130. At block 340, a token trigger service 140 monitoring detects updates to events logged by Historian and determines that a rule in Token Rules Engine 150 is satisfied. Block 340 may loop until the condition is satisfied or the process 350 is terminated. At block 344, the token trigger service 140 instructs the smart vault 120 to generate a token and register it on a blockchain 190 and list it on a token marketplace 180, and the process 350 may loop back to block 340.

The examples shown in FIGS. 2 and 3 demonstrate that the creation of tokens may be fully integrated into an architecture (e.g., system 100), which enables several unique and novel capabilities. As shown in FIG. 3, through the use of rules, tokens may be automatically generated at scale and aligned to particular priorities and desired outcomes. For example, a rules service may be used to enable the automated generation of token metadata at scale as aligned to an organization's priorities and desired outcomes. In some examples, the rules may be organized (e.g., within token rules engine 150) as follows:

Tablename: Organization
 [OrgID, OrgType, OrgContactInformation, OrgOwner, OrgVertical, OrgAsset(array of foreign Keys), OrgMonetizationPriorities(array of Foreign Keys), OrgExternalEnablers(array of foreignKeys), OrgOther]
Tablename: AccessTypes
 [AssetAccessTypeID, AccessMechanism, AccessSettings, AccessSecurityConditions, AccessDescription]
TableName: AssetTypes
 [AssetTypesID, AssetTypeDescription, AssetTypeAccessTypes (foreign Key Array), AssetTypesMetadataTypes (array), Monetization_priorities (foreign key array)]
TableName: ExternalEnablers Marketplace_or_BlockChainLocation
 [ExternalEnabler_ID, ExternalEnabler_SecuritySettings, ExternalEnabler_metadata]
TableName: MonetizationPriorities
 [MonetizationPriority_ID, Monetization_Description, Monetization_settings(array)]

As shown in FIGS. 2 and 3, additional tokens may be generated for an authenticated asset based on rules. For example, a rule may specify token generation settings and parameters, token blockchains for registering the new tokens, and token marketplaces for listing the new tokens. In some examples, once a token has been listed on a token marketplace, the monitoring service 170 can continually check for updates on the token itself and create entries into the historian 160. Updates to the historian 160 may initiate the token trigger service 140 to check the vault store for token rules and compliance, and new actions on a token, updates to asset access, and initiation of new token generation may be triggered from the check.

Such a method or architecture may also be implemented to enable the capture of a secondary set of actions which enable connotation of a user's experience of the tokenized asset(s). By using metadata entry points to control the access mechanisms, the system may collect automated and human-in-the-loop feedback on the access capabilities and quality. This data is fed into the historian 160 and may be used to automate additional token actions such as, for example, elimination of token triggers. In one example of such elimination, single-access tokens can be triggered for a period of time until the item itself (the asset) is gone. Such a functionality may be illustrated by an example of an art installation in which tokens are provided, where each token prompts the artist to take a jellybean from a jar. When the jellybean jar is empty, generation of the single-access tokens ceases automatically.

Such a method or architecture may also be implemented to provide the ability to monitor activities that occur in relation to a token and its proprietary information (such as an address visit or access link visit) and then to use the data gathered through the act of monitoring to create new automated services (such as creating new tokens). This type of data may be used, for example, to change the asset access types that are transferred by tokens (e.g., tokens for the same asset) which are generated over a period of time.

In other instances, the experience ratings may be used to determine, for a particular type of asset, which types of asset access have the highest user sentiment. Such a determination may in turn be used to automatically shift the tokenization suggestion based on metadata by similarity match (e.g., within an artist and/or across groups). The token trigger service 140 may perform such a determination with a straightforward asset metadata type match (as stored in AMADS 110), followed by a sentiment rating filter on the corresponding events logged in the historian 160, first sorting from highest to lowest, then sorting on the access type. The result of such filtering aligns the asset type to the experience ratings of other same asset type across assets and organizations and artists. The token trigger service 140 may use this data to automate the rule and asset tokenization and thus eliminate guesswork in prioritizing next releases, while also taking into account changing tastes and preferences over time.

Figure 4:
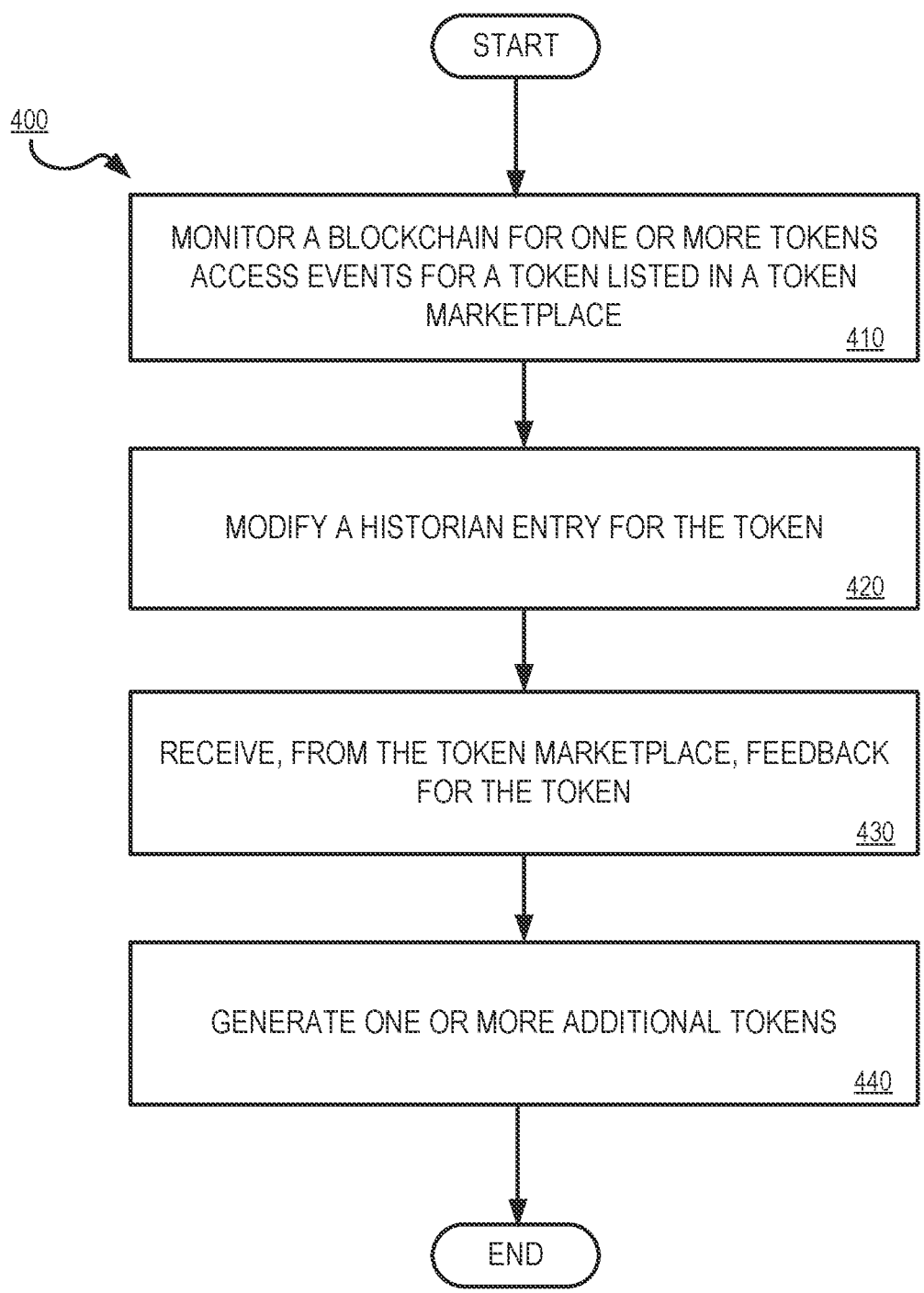
FIG. 4 shows a flowchart of an exemplary process for monitoring a token according to aspects of the present disclosure.

FIG. 4 shows a flowchart of an exemplary process 400 for monitoring a token (e.g., a baseline workflow for the monitoring of token metadata clickthrough for use in asset access configuration). In some examples, the process 400 for monitoring a token is implemented by the token generation and management system 100 or another computing system, such as computing system 800 as shown in FIG. 8. The process 400 for monitoring a token can be implemented in software or hardware or any combination thereof.

At block 410, a blockchain is monitored for one or more token access events for a token listed in a token marketplace. In some examples, each token access event includes at least one of a token viewing event and a token transfer event.

At block 420, a historian entry for the token is modified. In some examples, the historian entry is modified based on the one or more token access events.

At block 430, feedback for the token is received from the token marketplace. In some examples, the feedback includes at least one of a user sentiment of the token and a user quality rating of the token.

At block 440, in response to modifying the historian entry and receiving the feedback, one or more additional tokens are generated. In some examples, the one or more additional tokens generated according to one or more rules for the token.

Figure 5:
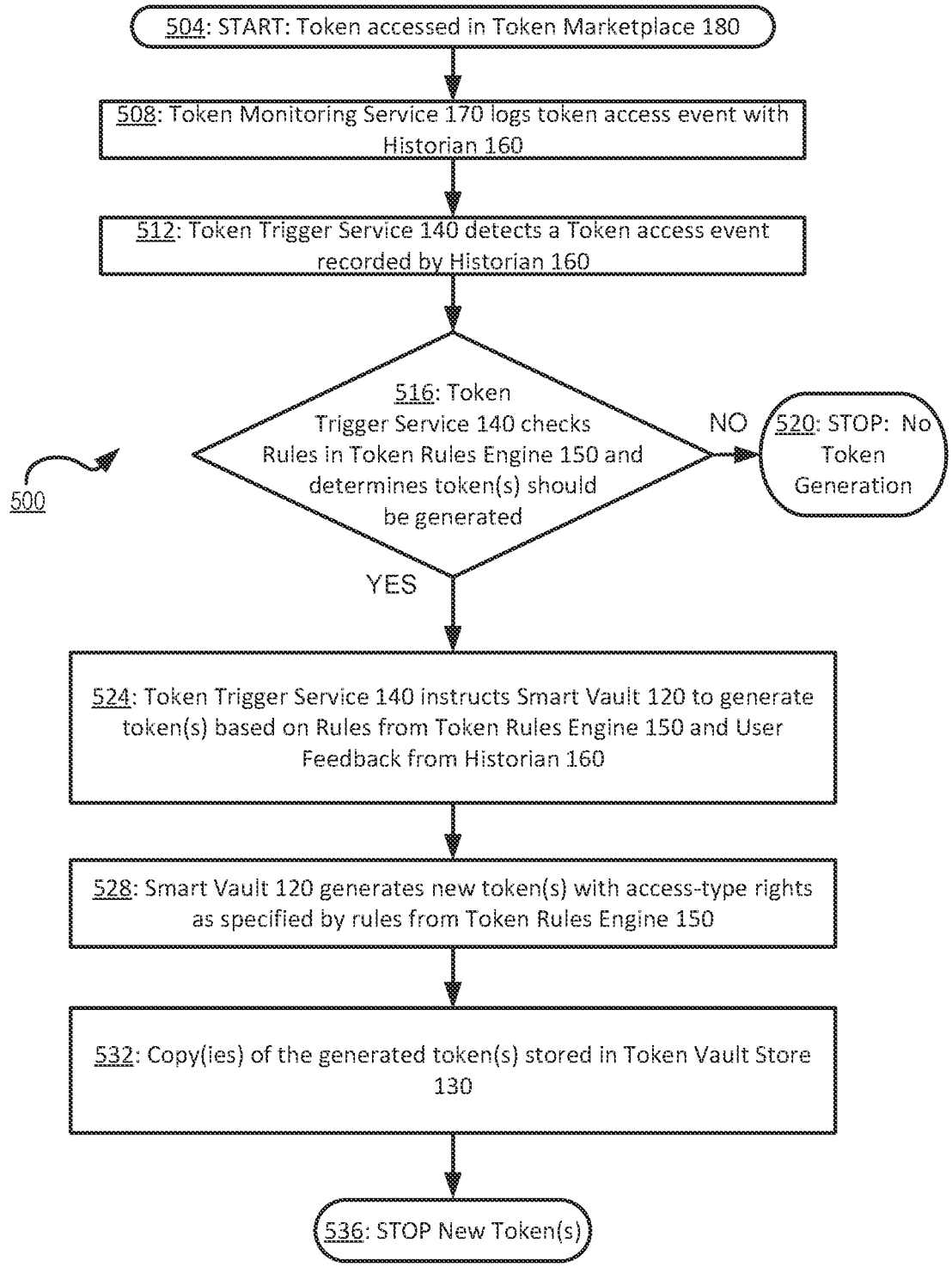
FIG. 5 shows a flowchart of an exemplary process for monitoring a token and generating new tokens according to aspects of the present disclosure.

FIG. 5 shows a flowchart of an exemplary process 500 for monitoring a token and generating new tokens. In some examples, the process 500 for monitoring a token and generating new tokens is implemented by the token generation and management system 100 or another computing system, such as computing system 800 as shown in FIG. 8. The process 500 for monitoring a token and generating new tokens can be implemented in software or hardware or any combination thereof. At block 504, a token on a secure ledger (e.g., a blockchain) is accessed in a token marketplace 180. At block 508, the token monitoring service 170 records an indication of the token access with the historian 160. For example, the token monitoring service 170 may log a token access event with the historian 160. At block 512, the token trigger service 140 detects the token access event recorded by the historian 160. At block 516, the token trigger service 140 checks one or more rules in the token rules engine 150 and determines whether one or more tokens should be generated. If the determination is negative, then the process terminates at block 520 (e.g., without generating any token). If the determination is positive, then at block 524 the token trigger service 140 instructs the smart vault 120 to generate one or more tokens based on one or more rules from the token rules engine 150 and user feedback from the historian 160. For example, the smart vault 120 may determine access-type rights for the tokens according to the one or more rules. At block 528, the smart vault 120 generates the one or more new tokens with access-type rights as specified by the one or more rules from the token rules engine 150. At block 532, copy(ies) of the generated token(s) are stored in the token vault store 130. At block 536, the process terminates, and one or more new tokens have been generated.

In the example of FIG. 5, access to one of the metadata links stored within the token metadata (as detected by the token trigger service 140) has triggered a token rule check. The token rule check (using token rules engine 150) may indicate that upon access of the authenticated assets, additional tokens for the authenticated asset should be generated. For example, the token rule check may indicate that the monetization priority for the asset is "create new children tokens once an access to the metadata link has been detected." In this instance, once a user has accessed the access link, new tokens are automatically generated. The rules may indicate that the new tokens are generated to include different access-type rights than the original token. For example, the access to the link may automatically trigger the creation of a hundred new tokens with a second set of metadata and access-type rights against one or more assets as determined by the rules engine. In some examples, access can be considered over a period of time. In other examples, a user rating mechanism may be used to determine user sentiment towards an authenticated asset. For example, authenticated assets that have the highest user sentiment can be used to automatically shift the tokenization suggestions towards those assets or similar assets.

The architecture 100 or 900 may be implemented to support token validation. For example, the architecture 100 or 900 may be implemented to perform a method that includes a data check (e.g., a hash check) for validating that the asset to which the token is linked matches the requested asset (e.g., the asset as originally stored). Such validation can be done both on-demand and in an automated fashion.

Figure 6:
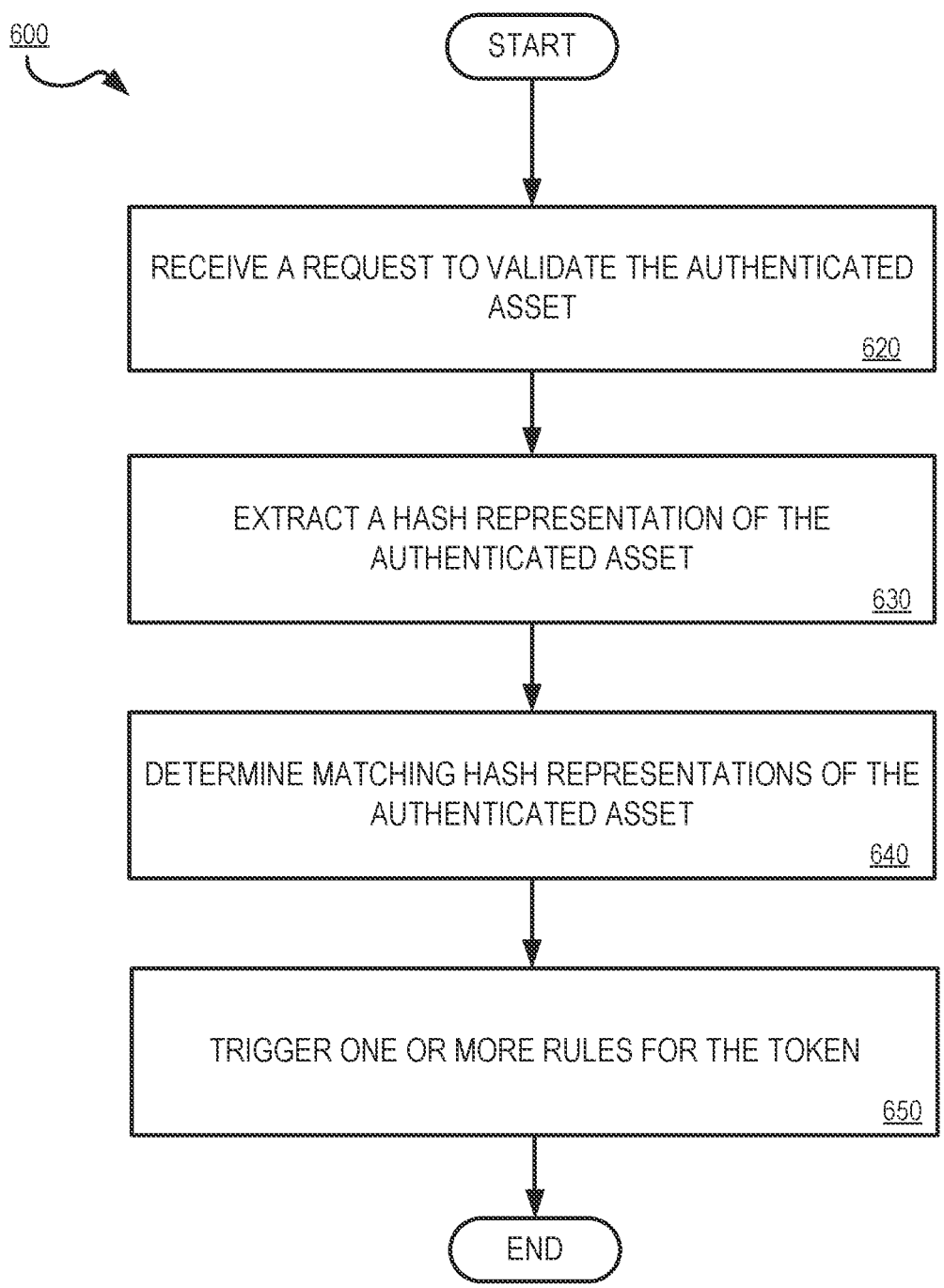
FIG. 6 shows a flowchart of an exemplary process for validating a token for a tokenized asset according to aspects of the present disclosure.

FIG. 6 shows a flowchart of an exemplary process 600 for validating a token for a tokenized asset. In some examples, the process 600 for validating a token is implemented by the token generation and management system 100 or another computing system, such as computing system 800 as shown in FIG. 8. The process 600 for validating a token for a tokenized asset can be implemented in software or hardware or any combination thereof.

In some examples, the token for an authenticated asset includes a token identifier, token owner information, and token metadata. In some examples, the token metadata includes an access link for accessing a first hash representation (e.g., a hash of a first representation) of the authenticated asset. The representation may be a large body of data (e.g., a high-resolution image), and a hash of the representation ("hash representation") is the value returned by a hash function that is applied to the representation. The hash representation is typically a smaller piece of information that can be used to quickly, and with very high but not absolute certainty, verify that one representation matches another representation.

At block 620, a request to validate the token is received. The request may be received, for example, from a user of a token marketplace who accesses the token from the token marketplace.

At block 630, in response to receiving the request to validate the token, a second hash representation (e.g., a hash of a second representation) of the authenticated asset is extracted from a token vault store.

At block 640, the first hash representation of the authenticated asset is determined to match the second hash representation of the authenticated asset.

At block 650, in response to determining that the first hash representation of the authenticated asset matches the second hash representation of the authenticated asset, one or more rules for the token is triggered.

Figure 7:
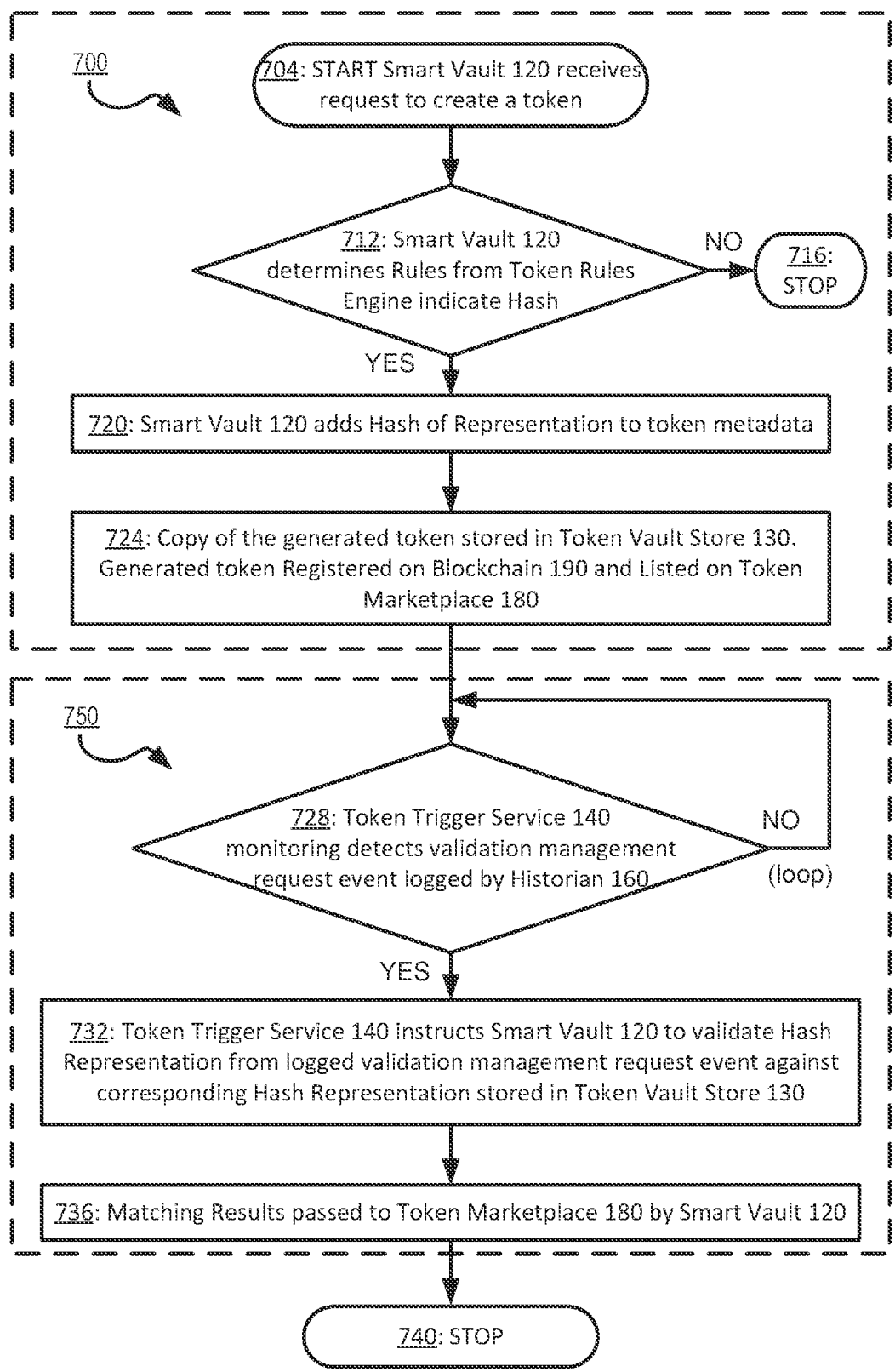
FIG. 7 shows a flowchart of an exemplary process for generating and listing a token for an asset and an exemplary process for validating the token according to aspects of the present disclosure.

FIG. 7 shows a flowchart of an exemplary process 700 for generating and listing a token for an asset and an exemplary process 750 for validating the token. In some examples, process 750 for validating a token for a tokenized asset (e.g., together with process 700) is implemented by the token generation and management system 100 or another computing system, such as computing system 800 as shown in FIG. 8. The process 750 for validating a token for a tokenized asset (e.g., together with process 700) can be implemented in software or hardware or any combination thereof. At block 704, the smart vault 120 receives a request to create a token. At block 712, the smart vault 120 determines whether rules from the token rules engine indicate a hash. If not, the process 700 stops (block 716). If yes, then at block 720 the smart vault 120 adds a hash of the representation to token metadata. At block 724, a copy of the generated token is stored in the token vault store 130, and the generated token is registered on a blockchain 190 and listed on a token marketplace 180. At block 728, the token trigger service 140 detects that the historian 160 has logged a validation management request event. Block 728 may loop until the condition is satisfied or the process 700 is terminated. At block 732, the token trigger service 140 instructs the smart vault 120 to validate a hash representation from the logged validation management request event against a corresponding hash representation stored in the token vault store 130. At block 736, the smart vault 120 passes matching results to the token marketplace 180.

As shown in FIG. 7, a representation check (e.g., as performed at block 732) can be used for validating that the linked asset matches the requested asset. The representation check can be done both on-demand and in an automated fashion. In some examples, the representation check may be added into an existing workflow.

FIG. 8 shows an exemplary computing system 800. For example, the computing system 800 can serve as the token generation and management system 100 of FIG. 1.

The computing system 800 includes one or more processors 801, one or more memories 802, RAM 803, one or more storage devices 804, one or more interfaces 805, and display 806. The one or more processors 801 can read one or more programs from the one or more memories 802 and execute them using RAM 803. Non-limiting examples of the one or more processors 801 include a field-programmable gate array (FPGA), an application-specific integrated circuit (ASIC), a microprocessor, or any combination of these. The one or more processors 801 can execute the one or more programs stored in the one or more memories 802 to perform operations. Examples of such operations can include any of the operations described above with respect to the token generation and management system 100. In some examples, the one or more programs can include processor-specific instructions generated by a compiler or an interpreter from code written in any suitable computer-programming language, such as C, C++, C#, Python, or Java.

The one or more memories 802 can be non-volatile and may include any type of memory device that retains stored information when powered off. Non-limiting examples of the memory 802 include electrically erasable and programmable read-only memory (EEPROM), flash memory, or any other type of non-volatile memory. At least some of the memory device can include a non-transitory computer-readable storage medium from which the one or more processors 801 can read instructions. A computer-readable storage medium can include electronic, optical, magnetic, or other storage devices capable of providing the one or more processors 801 with computer-readable instructions or other program code. Non-limiting examples of a computer-readable storage medium include magnetic disks, memory chips, ROM, random-access memory (RAM), an ASIC, a configured processor, optical storage, or any other medium from which a computer processor can read the instructions. The one or more programs may be configured to generate, monitor, and validate tokens. In some examples, the one or programs are configured to generate a token as shown in FIGS. 2 and 3, monitor a token as shown in FIGS. 4 and 5, and validate a token as shown in FIGS. 6 and 7. In some embodiments, the one or more programs are configured to store and manage data for any of the operations described above with respect to the token generation and management system 100.

One or more storage devices 804 may be configured to store data generated by any of the operations described above with respect to the token generation and management system 100. The one or more storage devices 804 may further be configured to store graphical user interface pages. Additionally, the one or more interfaces 805 include an interface for interfacing with blockchain(s) 190 and an interface for interfacing with token marketplace(s) 180. Display 806 may be configured to display images, screens, and interfaces. In some embodiments, display 806 is configured to display the user interface of the smart vault 120 in accordance with the features described above. In some embodiments, using the display 806, generate and manage tokens for authenticated assets.

The computing system 800 may also include other input and output (I/O) components. Examples of such input components can include a mouse, a keyboard, a trackball, a touch pad, and a touch-screen display. Examples of such output components can include the display 806, an audio display, and a haptic display. Examples of the display 806 can include a liquid crystal display (LCD), a light-emitting diode (LED) display, and a touch-screen display. An example of an audio display can include speakers. Examples of a haptic display may include a piezoelectric vibration device or an eccentric rotating mass (ERM) device.

New automation mechanisms that include the ability to automatically attach and execute token creation variations to access-type rights may be implemented through establishment of physical asset chain-of-custody, then physical and virtual access-type rights, token validation mechanisms (which may include asset validation), and right-to-validation in blockchain tokenization methods (including NFT) combined with token monitoring, and access monitoring. A smart vault authentication system as described herein may be integrated with second- and third-party authentication services (e.g., with premium archival services). Such a service, and the archivist (which may be human or software-based) may be used as the layer to authenticate that an asset x is indeed what is being portrayed (e.g., the archivist proves the provenance of the asset and saves this asset metadata into the smart vault (e.g., into the AMADS 110)). This action generates archivist sign-off documentation of the authenticity of the asset, backed up by the metadata linked to the asset. Such authentication can also be accomplished in other ways.

As described above, metadata insertion on token generation may be used to connect a token with a known record of authenticity and proof of physical custody. This link may be implemented to enable anyone with ownership or planned ownership of an asset to verify asset existence and/or authenticity through physical asset validation, including but not limited to RFID tracking, live image providers, audio playback, visual playback, sensor data, inventory tracking systems data and human-in-the-loop physical asset access. As the access-type rights are associated with the token on generation, and are stored both in the token and within the smart vault system, the operator of the system (e.g., a secure storage facility service provider) is able to pre-filter the access methods and supply the token owner with on-demand access to verified assets. Asset access-type rights are able to be set on token creation, and as such, the token may be placed to market with variable pricing aligned to access.

Such mechanisms may be implemented to support the ability to trace and assess prior access methods and to utilize the resulting data in the automation of generation of a second (or further) generation of large-volume or high-turnover tokens. Examples of use cases include token purchasing to be the "first to hear rare recording" of a famous musical artist with time-bound ownership; upon audio play access, a second set of 'second listen' tokens is generated (which may be sold at a lower price to be among the first one hundred to hear the recording); and then create additional cascading children tokens for lower levels and values of access.

Such mechanisms may also be implemented to support any of the following: the ability to trace access by asset metadata and to generate automated and human-in-the-loop suggestion engines on the generation of new tokens; the automation of token metadata based on a rules engine plus success and sentiment measurement from prior tokens of matching asset metadata types; or the ability to prevent tokens from being created where authentication metadata is not available. Where a system is established that enables the use of verification on tokenization using proof of authenticity, the inverse also holds true: the system may require that an individual asset must have an authentication stamp prior to enabling clearance to tokenize any asset in a manual or automated fashion.

Such mechanisms may also be implemented to support authentication of master files. For example, a smart vault may be implemented to provide an authentication that a specific asset is the original master (e.g., the first recording) of a song or piece of music. Such authentication would allow the artist to negotiate with record labels or other parts interested in acquiring the original master. Such authentication would also enable marketplaces to pre-verify that a token's claim is authenticated prior to enabling listing of the token or insertion of the token into the blockchain (i.e., somewhat different from publishing to marketplaces).

The systems and methods of the present disclosure may be implemented using hardware, software, firmware, or a combination thereof and may be implemented in one or more computer systems or other processing systems. Some embodiments of the present disclosure include a system including one or more processors. In some embodiments, the system includes a non-transitory computer readable storage medium containing instructions which, when executed on the one or more processors, cause the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the above description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

In the following sections, further exemplary embodiments are provided. Example 1 includes a method of generating a token (e.g., an NFT) for an authenticated asset, wherein the token includes: first information linking the token with proof of custody for the authenticated asset, and second information indicating a first access-type right for the authenticated asset.

Example 2 includes the method of Example 1 or some other example herein, the method further comprising requesting a token for the authenticated asset, wherein the authenticated asset is one among a plurality of authenticated assets.

Example 3 includes the method of any of Examples 1-2 or some other example herein, the method further comprising determining one or more rules for generating the token, each rule of the one or more rules comprising one or more token generation variations, wherein, for at least one of the one or more rules, at least one of the one or more token generation variations designates a secure ledger.

Example 4 includes the method of Example 3 or some other example herein, wherein generating the token is performed according to the one or more rules.

Example 5 includes the method of any of Examples 1-4 or some other example herein, wherein the token includes at least one of: a token identifier, a token creation timestamp, a token modification timestamp, or token owner information.

Example 6 includes the method of any of Examples 1-5 or some other example herein, wherein the token comprises third information linking the token to a representation of the authenticated asset.

Example 7 includes the method of Example 6 or some other example herein, wherein the representation includes proof of authenticity for the authenticated asset.

Example 8 includes the method of any of Examples 1-7 or some other example herein, wherein the second information indicates that the first access-type right is for a first form among a plurality of different forms of the asset.

Example 9 includes the method of Example 8 or some other example herein, wherein the first access-type right is limited to a specified time period.

Example 10 includes the method of any of Examples 1-9 or some other example herein, the method further comprising storing the token, one or more rules for the token, and a key linking the token to the authenticated asset.

Example 11 includes a system comprising: one or more computer-readable storage media to store a plurality of rules for generating tokens (e.g., NFTs); and one or more processors coupled with the one or more computer-readable storage media, the one or more processors to perform operations comprising generating, according to one or more of the plurality of rules, a token for an authenticated asset, wherein the token includes: first information linking the token with proof of custody for the authenticated asset, and second information indicating a first access-type right to the authenticated asset.

Example 12 includes the system of Example 11 or some other example herein, wherein each rule of the plurality of rules comprises one or more token generation variations, wherein: for at least one of the plurality of rules, at least one of the one or more token generation variations designates a secure ledger; and generating the token is performed according to the at least one of the plurality of rules.

Example 13 includes the system of any of Examples 11-12 or some other example herein, wherein the token comprises third information linking the token to a representation of the authenticated asset.

Example 14 includes the system of any of Examples 11-13 or some other example herein, wherein the second information indicates that the first access-type right is for a first form among a plurality of different forms of the asset.

Example 15 includes the system of Example 14 or some other example herein, wherein the first access-type right is limited to a specified time period.

Example 16 includes a non-transitory computer-readable storage medium storing instructions that when executed by one or more processors, cause the one or more processors to perform operations comprising generating a token (e.g., an NFT) for the authenticated asset, wherein the token includes: first information linking the token with proof of custody for the authenticated asset, and second information indicating a first access-type right to the authenticated asset.

Example 17 includes the non-transitory computer-readable storage medium of Example 16 or some other example herein, the operations further comprising determining one or more rules for generating the token, each rule of the one or more rules comprising one or more token generation variations, wherein: for at least one of the one or more rules, at least one of the one or more token generation variations designates a secure ledger; and generating the token is performed according to the one or more rules.

Example 18 includes the non-transitory computer-readable storage medium of any of Examples 16-17 or some other example herein, wherein the token comprises third information linking the token to a representation of the authenticated asset.

Example 19 includes the non-transitory computer-readable storage medium of any of Examples 16-18 or some other example herein, wherein the second information indicates that the first access-type right is for a first form among a plurality of different forms of the asset.

Example 20 includes the non-transitory computer-readable storage medium of Example 19 or some other example herein, wherein the first access-type right is limited to a specified time period.

Example 21 includes a method for tracking token access, the method comprising: detecting an indication of access to a first token (e.g., an NFT), wherein the first token is on a secure ledger and is associated with a first asset; receiving feedback for the first token, the feedback comprising at least one of a user sentiment of the first token or a user quality rating of the first token; and based on detecting the indication of access or receiving the feedback, generating a second token associated with the first asset.

Example 22 includes the method of Example 21 or some other example herein, wherein generating the second token is performed according to one or more rules for the first token.

Example 23 includes the method of any of Examples 21-22 or some other example herein, wherein: generating the first token is performed according to a first plurality of rules; and generating the second token is performed according to a second plurality of rules that differs from the first plurality of rules.

Example 24 includes the method of any of Examples 21-23 or some other example herein, wherein the access comprises at least one of a viewing of the first token or a transfer of the first token.

Example 25 includes the method of any of Examples 21-24 or some other example herein, wherein: the first token indicates a first access-type right for the first asset, and the second token indicates a second access-type right for the first asset that is different than the first access-type right.

Example 26 includes the method of Example 25 or some other example herein, wherein: the first access-type right is for a first time period, and the second access-type right is for a second time period that is different than the first time period.

Example 27 includes the method of any of Examples 25-26 or some other example herein, wherein: the first access-type right is for a first form of the first asset, and the second access-type right is for a second form of the first asset that is different than the first form.

Example 28 includes the method of any of Examples 21-27 or some other example herein, the method further comprising listing at least one of the first token or the second token in a token marketplace.

Example 29 includes a system comprising: one or more computer-readable storage media storing indications of token access; and one or more processors coupled with the one or more computer-readable storage media, the one or more processors to perform operations according to the method of any of Examples 21-28.

Example 30 includes a non-transitory computer-readable storage medium storing instructions that when executed by one or more processors, cause the one or more processors to perform operations according to the method of any of Examples 21-28.

Example 31 includes a method for validating a token (e.g., an NFT) for a tokenized asset, the method comprising: receiving a request to validate the token, the token including information linking the token to a first representation of the asset; in response to receiving the request to validate the token, obtaining a second representation of the asset; and determining whether the first representation of the asset matches the second representation of the asset.

Example 32 includes the method of Example 31, the method comprising: prior to receiving the request to validate the token, listing the token on a token marketplace.

Example 33 includes the method of Example 32, wherein receiving the request to validate the token comprises receiving the request from a user of the token marketplace.

Example 34 includes the method of any of Examples 31-33, wherein the method further comprises, in response to determining that the first representation of the asset matches the second representation of the asset, triggering one or more rules for token generation.

Example 35 includes the method of Example 34, wherein the method further comprises generating at least one second token for the asset based on the one or more rules.

Example 36 includes the method of Example 35, wherein: the token includes information indicating a first access-type right to the asset, and the second token includes information indicating a second access-type right to the asset that is different than the first access-type right.

Example 37 includes the method of Example 36, wherein: the first access-type right is for a first time period, and the second access-type right is for a second time period that is different than the first time period.

Example 38 includes the method of any of Examples 31-37, wherein the token includes at least one of: a token identifier, and token owner information.

Example 39 includes a system comprising: one or more computer-readable storage media storing representations of assets; and one or more processors coupled with the one or more computer-readable storage media, the one or more processors to perform operations according to the method of any of Examples 31-38.

Example 40 includes a non-transitory computer-readable storage medium storing instructions that when executed by one or more processors, cause the one or more processors to perform operations according to the method of any of Examples 31-38.

Example 41 may include one or more non-transitory computer-readable media comprising instructions to cause an electronic device, upon execution of the instructions by one or more processors of the electronic device, to perform one or more elements of a method described in or related to any of Examples 1-40, or any other method or process described herein.

Example 42 may include an apparatus comprising logic, modules, or circuitry to perform one or more elements of a method described in or related to any of Examples 1-40, or any other method or process described herein.

Example 43 may include a method, technique, or process as described in or related to any of Examples 1-40, or portions or parts thereof.

Example 44 may include an apparatus comprising: one or more processors and one or more computer-readable media comprising instructions that, when executed by the one or more processors, cause the one or more processors to perform the method, techniques, or process as described in or related to any of Examples 1-40, or portions thereof.

Example 45 may include a computer program comprising instructions, wherein execution of the program by a processing element is to cause the processing element to carry out the method, techniques, or process as described in or related to any of Examples 1-40, or portions thereof.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A computer-implemented method for tokenizing an authenticated asset, the method comprising:
   generating a token for the authenticated asset, wherein the token includes:
      first information linking the token with proof of custody for the authenticated asset, and
      second information indicating a first non-ownership access-type right to the authenticated asset;
   registering the token on a secure ledger;
   monitoring the secure ledger to identify one or more access events for the token; and
   generating, responsive to detection of an access event for the token, one or more new tokens for the authenticated asset, wherein the one or more new tokens each comprise a second non-ownership access-type right different than the first non-ownership access-type right.

2. The computer-implemented method of claim 1, the method further comprising requesting the token for the authenticated asset, wherein the authenticated asset is one among a plurality of authenticated assets.

3. The computer-implemented method of claim 1, the method further comprising determining one or more rules for generating the token, each rule of the one or more rules comprising one or more token generation variations,
   wherein, for at least one of the one or more rules, at least one of the one or more token generation variations designates the secure ledger, wherein the secure ledger is a blockchain.

4. The computer-implemented method of claim 3, wherein generating the token is performed according to the one or more rules.

5. The computer-implemented method of claim 1, wherein the token includes at least one of: a token identifier, a token creation timestamp, a token modification timestamp, or token owner information.

6. The computer-implemented method of claim 1, wherein the token comprises third information linking the token to a representation of the authenticated asset.

7. The computer-implemented method of claim 6, wherein the representation includes proof of authenticity for the authenticated asset.

8. The computer-implemented method of claim 1, wherein the second information indicates that the first non-ownership access-type right is for a first form among a plurality of different forms of the asset.

9. The computer-implemented method of claim 8, wherein the first non-ownership access-type right is limited to a specified time period.

10. The computer-implemented method of claim 1, the method further comprising storing the token, one or more rules for the token, and a key linking the token to the authenticated asset.

11. A system comprising:
   one or more computer-readable storage media to store a plurality of rules for generating tokens; and
   one or more processors coupled with the one or more computer-readable storage media, the one or more processors to perform operations comprising:
      generating, according to one or more of the plurality of rules, a token for an authenticated asset, wherein the token includes:
         first information linking the token with proof of custody for the authenticated asset, and
         second information indicating a first non-ownership access-type right to the authenticated asset;
      registering the token on a secure ledger;
      monitoring the secure ledger to identify one or more access events for the token; and
      generating, responsive to detection of an access event for the token, one or more new tokens for the authenticated asset, wherein the one or more new tokens each comprise a second non-ownership access-type right different than the first non-ownership access-type right.

12. The system of claim 11, wherein each rule of the plurality of rules comprises one or more token generation variations, wherein:
   for at least one of the plurality of rules, at least one of the one or more token generation variations designates the secure ledger, and wherein the secure ledger is a blockchain; and
   generating the token is performed according to the at least one of the plurality of rules.

13. The system of claim 11, wherein the token comprises third information linking the token to a representation of the authenticated asset.

14. The system of claim 11, wherein the second information indicates that the first non-ownership access-type right is for a first form among a plurality of different forms of the asset.

15. The system of claim 14, wherein the first non-ownership access-type right is limited to a specified time period.

16. A non-transitory computer-readable storage medium storing instructions that when executed by one or more processors, cause the one or more processors to perform operations comprising:
   generating a token for an authenticated asset, wherein the token includes:
      first information linking the token with proof of custody for the authenticated asset, and
      second information indicating a first non-ownership access-type right to the authenticated asset;
   registering the token on a secure ledger;
   monitoring the secure ledger to identify one or more access events for the token; and
   generating, responsive to detection of an access event for the token, one or more new tokens for the authenticated asset, wherein the one or more new tokens each comprise a second non-ownership access-type right different than the first non-ownership access-type right.

17. The non-transitory computer-readable storage medium of claim 16, the operations further comprising determining one or more rules for generating the token, each rule of the one or more rules comprising one or more token generation variations, wherein:

for at least one of the one or more rules, at least one of the one or more token generation variations designates the secure ledger, wherein the secure ledger is a blockchain; and generating the token is performed according to the one or more rules.

18. The non-transitory computer-readable storage medium of claim 16, wherein the token comprises third information linking the token to a representation of the authenticated asset.

19. The non-transitory computer-readable storage medium of claim 16, wherein the second information indicates that the first non-ownership access-type right is for a first form among a plurality of different forms of the asset.

20. The non-transitory computer-readable storage medium of claim 19, wherein the first non-ownership access-type right is limited to a specified time period.

* * * * *